(12) United States Patent
Hotch

(10) Patent No.: US 6,648,160 B2
(45) Date of Patent: Nov. 18, 2003

(54) FLUSH FUEL CAP

(76) Inventor: Matthew Jon Hotch, 124 1/2 N. Princeton Ave., Fullerton, CA (US) 92831

( * ) Notice: Subject to any disclaimer, the term of this patent is extended or adjusted under 35 U.S.C. 154(b) by 0 days.

(21) Appl. No.: 09/906,917

(22) Filed: Jul. 17, 2001

(65) Prior Publication Data

US 2002/0158072 A1 Oct. 31, 2002

(51) Int. Cl.[7] ............................................... B65D 51/18
(52) U.S. Cl. ............... 220/255; 220/288; 220/DIG. 33; 220/86.2
(58) Field of Search .......................... 220/288, DIG. 33, 220/86.2, DIG. 34, 86.1, 255

(56) References Cited

U.S. PATENT DOCUMENTS

| | | | | |
|---|---|---|---|---|
| 3,815,776 A | * | 6/1974 | MacMillan | 220/DIG. 33 |
| 4,223,799 A | * | 9/1980 | Eyster et al. | 220/230 |
| 4,231,240 A | * | 11/1980 | Fujita et al. | 220/288 |
| 4,811,763 A | * | 3/1989 | Kupske | 220/86.2 |
| 5,845,800 A | * | 12/1998 | Shaw et al. | 220/210 |
| 6,209,745 B1 | | 4/2001 | Jansson | |
| 6,286,704 B1 | * | 9/2001 | Harris | 220/304 |

* cited by examiner

Primary Examiner—Tri M. Mai
(74) Attorney, Agent, or Firm—Knobbe, Martens, Olson & Bear, LLP

(57) ABSTRACT

A flush-fitting fuel tank cap 110 is described herein. A flush-fitting tank cap 110 having features and advantages of the present invention is preferably characterized by a cylinder portion 30 adapted such that it may screw into a correspondingly threaded gasoline tank neck or bung 100. The tank cap 110 also preferably includes a handle portion 20 which is preferably mounted in operative relationship to the cylinder portion 30 such that rotation of the handle 20 causes corresponding rotation of the cylinder portion 30. The handle 20 is preferably movable between an up and a down position. A pin 40 is preferably disposed at or near the distal end 22 of the handle portion 20. The handle portion 20 is preferably disposed such that the pin 40 may fit into a slot 50 and a notch 54 formed in the cylinder portion. The pin 40 is preferably free to slide linearly within the slot 50, but the pin 40 preferably rotationally engages within the slot such that the handle portion 20 is restrained from rotational motion relative to the cylinder portion 30 while the handle is in the "up" position as described herein.

24 Claims, 6 Drawing Sheets

FLUSH FUEL CAP

BACKGROUND OF THE INVENTION

1. Field of the Invention

This invention relates generally to motorcycles or other vehicles, and specifically to a closure device for a fuel tank.

2. Description of the Related Art

Gasoline tanks on motorcycles are typically filled through an opening in the top of the tank. Typical motorcycle gas caps must extend above the outer surface of the tank, or require an irregular shape in order to be grasped and tightened or loosened. The cap extending upwards tends to be unsightly and undesirable. It is therefor desirable to have a fuel tank closure device which may sit flush with the outer finished surface of the tank.

This has been achieved to a certain degree in some cases by the use of a flush-fitting keyed gas cap. Unfortunately, this requires the rider to carry a separate key which can be lost. Additionally, the keyhole requires part of the cap to have a different finish than the surrounding surface of the tank. Thus it is desirable to have a cap which can be painted to match the surrounding material, including blending complex patterns over the surface of the cap.

SUMMARY OF THE INVENTION

It is therefore an object of the present invention to provide a fuel tank closure device which will fit flush with the outer surface of the gas tank when closed, but which can be easily removed without the use of extra tools such as keys etc. It is another object of the present invention to provide a fuel tank closure device which will always be returned to its original position such that the orientation of painted patterns may be maintained. Another object of the present invention is to allow gases within a fuel tank to safely vent while preventing liquid fuel from spilling out of the gas tank, even when a vehicle is not in its desired orientation with its wheels on the ground.

A flush-fitting tank cap having features and advantages of the present invention may be characterized by a handle portion which is operatively mounted to a cylinder portion such that the handle portion may be rotated and extended relative to the cylinder portion. The handle portion preferably has a central shaft which extends through a hole bored through the center of the cylinder portion. The central shaft preferably has a pin substantially near its distal end which fits into a slot in the cylinder portion. A flush-fitting tank cap having features and advantages of the present invention also preferably includes a rubber gasket or washer to seal the cap to the opening in the neck of the gas tank.

The handle portion is preferably movable between an "up" and a "down" position. In the "up" position, the handle portion is preferably raised above the top of the cylinder portion, and is substantially rotationally fixed, but linearly movable in the downward direction relative to the cylinder portion. In this position, rotation of the handle portion may allow the cap to be screwed into or out of the correspondingly threaded gas tank opening. In order to move from the up position to the down position, the handle portion is pushed downwards and rotated to its down position. In the down position, the pin rests in a notch formed at some angle relative to the slot. In some embodiments, a baffle plate may be secured to the distal end of the cylinder to prevent liquid fuel from leaking from the gas tank while permitting the venting of gases around at least a portion of the plate.

The handle portion of a flush-fitting tank cap having features and advantages of the present invention is preferably adapted such that the handle portion of the cap will always be replaced in exactly the same position after each use such that the orientation of any painted patterns incorporating the finished surface of the cap may be maintained.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION OF THE PREFERRED EMBODIMENT

Figure 1:
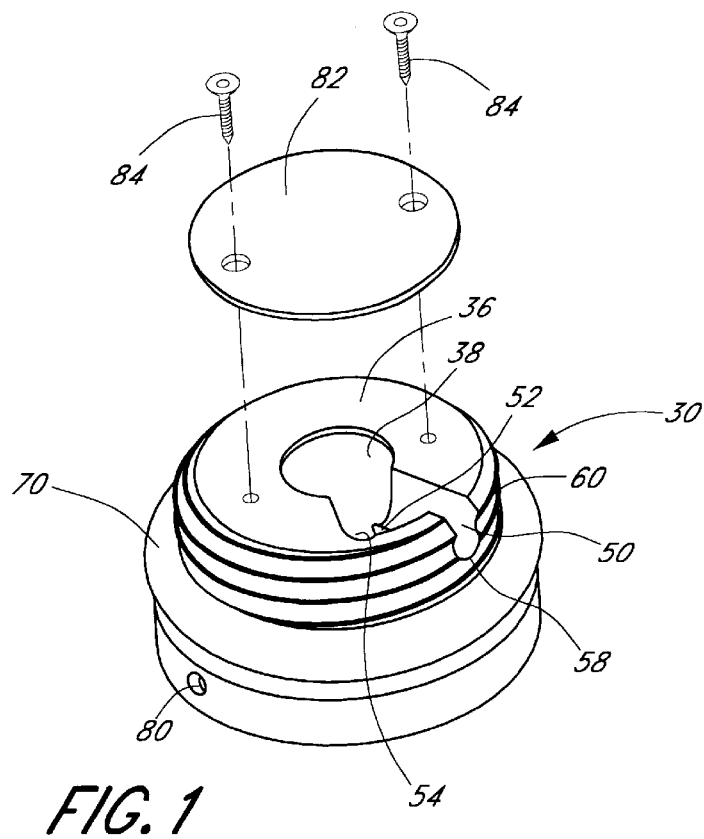
FIG. 1 is a perspective view of the bottom of a cylinder portion having features and advantages of the present invention.

Referring to FIGS. 1–8, a flush-fitting tank cap 110 having features and advantages of the present invention includes a cylinder portion 30 threaded such that it may screw into a correspondingly threaded fuel tank neck or bung 100. The tank cap 110 also preferably includes a handle portion 20 which is preferably mounted in operative relationship to the cylinder portion 30 such that rotation of the handle 20 causes corresponding rotation of the cylinder portion 30. A pin 40 is preferably disposed at or near the distal end 22 of the handle portion 20. The handle portion 20 is disposed such that the pin 40 may fit into a slot 50 formed in the cylinder portion 30. The pin 40 is preferably free to slide within the slot 50, but the pin 40 preferably engages within the slot 50 such that the handle portion 20 is restrained from rotational motion relative to the cylinder portion 30 while the handle is in the "up" position as described herein below.

Figure 2:
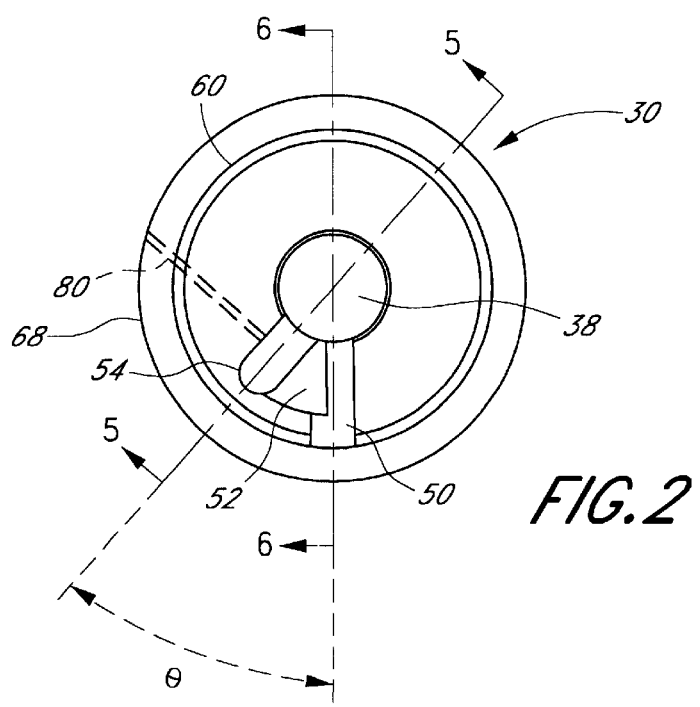
FIG. 2 is a bottom plan view of the cylinder portion.
Figure 3:
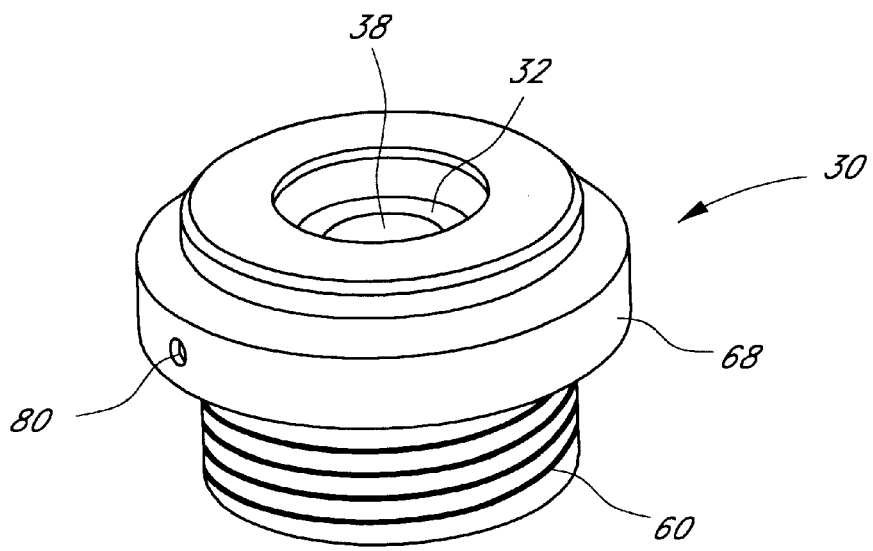
FIG. 3 is a perspective view of the top of the cylinder portion.
Figure 5:
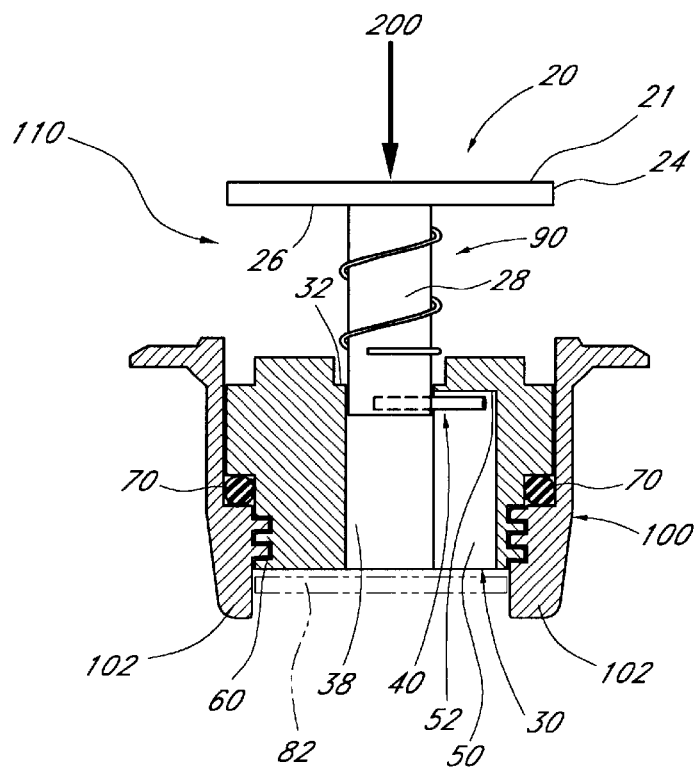
FIG. 5 is a section view of the tank cap of the present invention including the cylinder portion of FIG. 1 and the handle portion of FIG. 4 with the handle portion shown in the up position.
Figure 6:
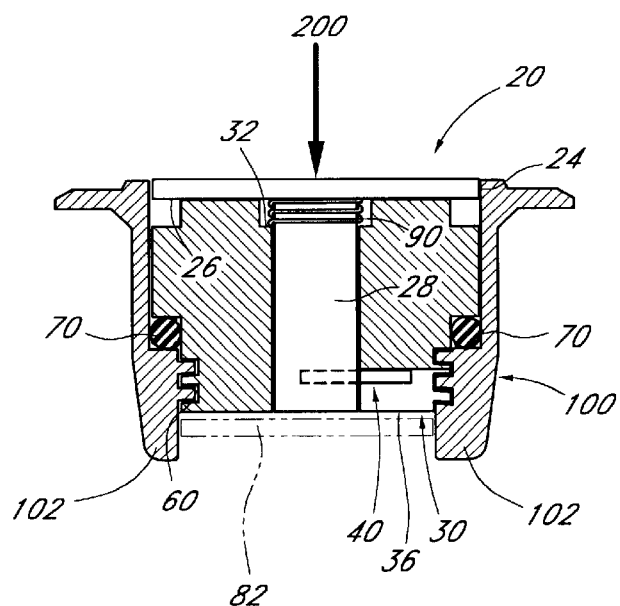
FIG. 6 is a section view similar to FIG. 5, but with the a handle portion shown in the down and rotated position.

FIGS. 1 and 2 show a cylinder portion 30 having features and advantages of the present invention. The cylinder portion 30 preferably has a hole 38 along its circular central axis. The hole 38 is sized such that the shaft 28 of the handle portion 20 may be inserted therein. The cylinder portion 30 also preferably has a threaded section 60. The threaded section 60 is preferably adapted such that it cooperates with mating threads in a fuel tank opening 100 (FIGS. 5 and 6). The top section 68 of the cylinder portion 30 preferably has a larger diameter than the threaded section 60, and preferably has a circular shelf 32 surrounding the hole. The circular shelf 32 is preferably formed such that the spring 90 (FIG. 6) may rest thereon when the handle 20 is in the down position.

The cylinder portion 30 also includes a slot 50 and a notch 54 each formed in planes parallel to, and intersecting the circular central axis of the cylinder portion 30. In the preferred embodiment, the notch 54 and slot 50 are separated by an angle θ of substantially less than ninety degrees relative to one another. The pie-shaped section 52 between the notch 54 and the slot 50 is preferably at an elevation such that the pin 40 (FIG. 6) may move freely over the pie-shaped section 52 when the handle 20 (FIG. 6) is in an intermediate position as described below.

The cylinder portion 30 also preferably has a small pressure relief hole 80 formed such that it creates a passageway between the outside rim 68 of the cylinder portion 30 and the inside of the notch 50 which is open to the tank. The hole 80 is intended to provide pressure relief for thermally induced pressure variations within the tank. As will be recognized by one of skill in the art, the hole 80 may be formed in a number of locations in order to allow air to pass between the inside and the outside of the tank 100 (FIG. 7).

Referring to FIG. 1, a baffle plate 82 may be secured to the cylinder portion 30 to prevent liquid fuel from traveling through slot 50 and out of the tank through hole 80. Preferably, the plate 80 is sized such that gases may travel around the periphery of at least a portion of the plate 80 and into the slot 50 to escape from the tank through hole 80. Alternatively, the hole 80 may be in fluid communication with the notch 54 as shown in FIG. 2, to permit the escape of gases from the tank, as will be easily understood by those of skill in the art. The plate 82 may be secured to the cylinder 30 through the use of screws 84 as shown in FIG. 1 or through other means known to those of skill in the art including, but not limited to, welding or adhering the plate 82 to the cylinder 30 or by forming the plate and cylinder from a unitary piece. Advantageously, the plate 82 deflects liquid fuel from entering the slot 50 or notch 54 when the vehicle is upside down or sideways. Thus, for example, in the event that a motorcycle tips over, the baffle plate 82 prevents liquid fuel from disadvantageously leaking out of the tank and causing a fire hazard. Spilled fuel may also lead to a disadvantageous explosion which may harm individuals using the vehicle or innocent bystanders.

Figure 7:
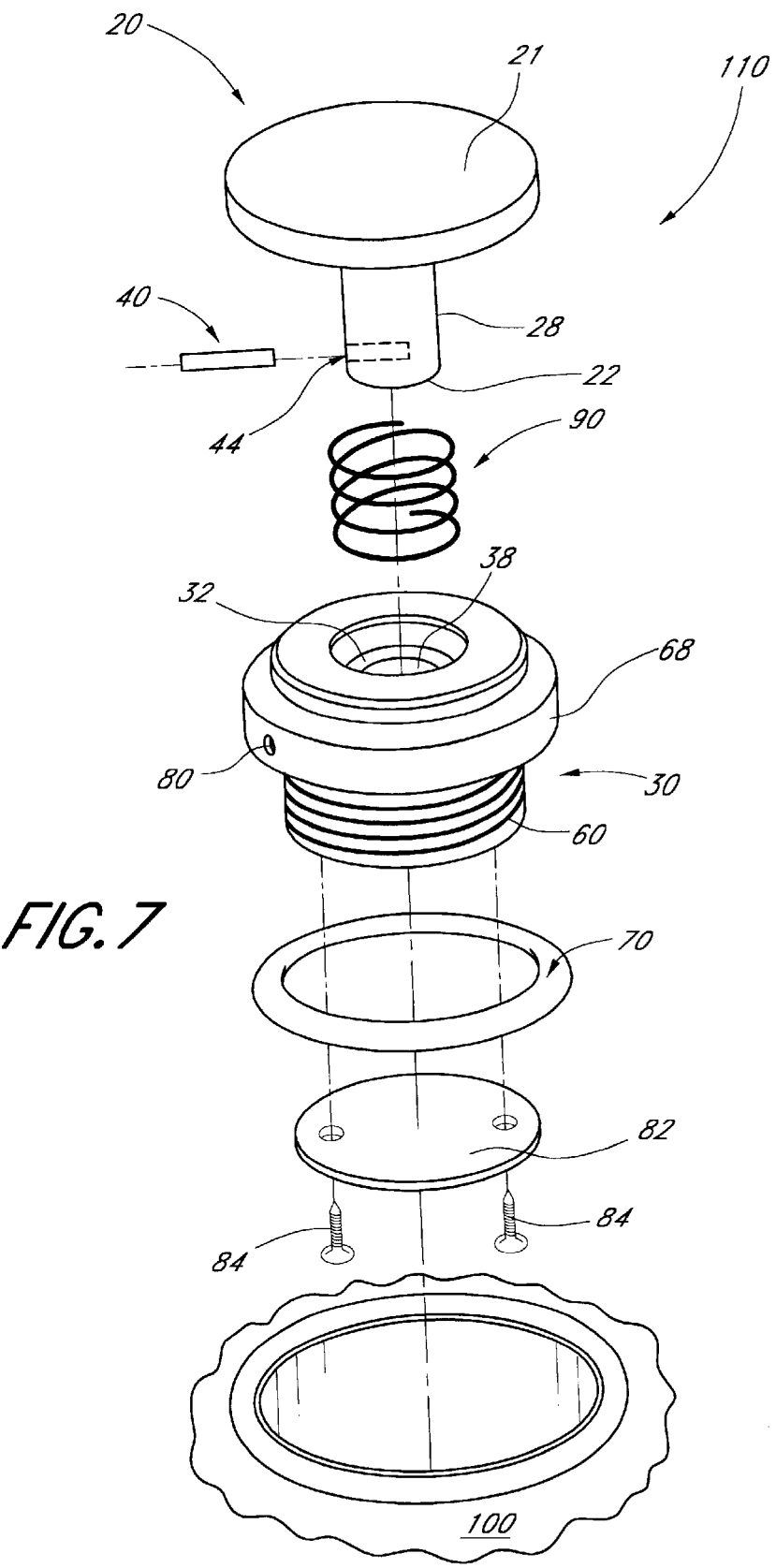
FIG. 7 is an exploded view of the various parts of the tank cap shown in FIG. 5.

As shown in FIG. 7, a rubber washer is preferably disposed on the cylinder portion 30 above the threaded section 60 such that when the cap 110 is screwed into the tank neck 100, the washer will be compressed, thereby sealing the tank. In an alternative embodiment, the threaded section 60 is covered by a gasket material. The gasket is preferably made of a substantially non-compressible polymer such as nylon or polyvinyl chloride (PVC), and is preferably approximately $\frac{1}{16}$"–$\frac{3}{16}$" thick.

Figure 4:
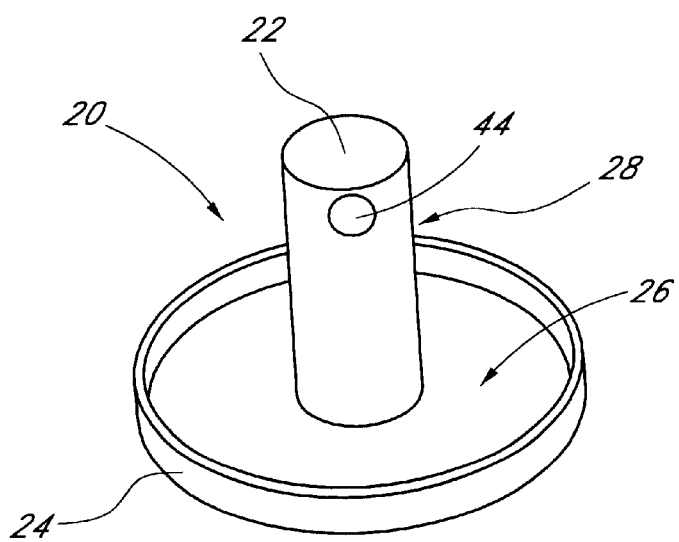
FIG. 4 is a perspective view of a handle portion having features and advantages of the present invention.

Referring to FIG. 4, the handle portion 20 preferably includes a disk section 24 and a shaft section 28. The disk 24 and shaft 28 are preferably integrally machined from a single piece of material, although the part could also be formed by other methods. Alternatively, the disk 24 and shaft 28 could be formed separately and then welded, glued, or otherwise attached together. The disk 24 is preferably of a suitable thickness to prevent bending or warping over time. Depending on the material used to manufacture the disk 24, the thickness may vary as more rigid materials may have a smaller thickness than more flexible materials. The shaft 28 is preferably solid, although it may also be a hollow tube. There is preferably a hole 44 formed in the shaft 28 perpendicular to, and intersecting the longitudinal axis of the shaft 28 and substantially near the distal end 22 of the shaft 28. Alternatively, the hole 44 may be located at a point closer to the disk section 24 of the handle 20. A pin 40 is preferably press-fit into the hole 44 in the shaft 28 such that it extends substantially outward from the shaft 28. Alternatively, the pin 40 may be formed integrally with the shaft 28 by machining or casting or other processes known in the art. The pin 40 and slot 50 are preferably relatively sized such that the pin 40 may move freely within the slot 50 when moving the handle 20 between the up and down positions.

Figure 8:
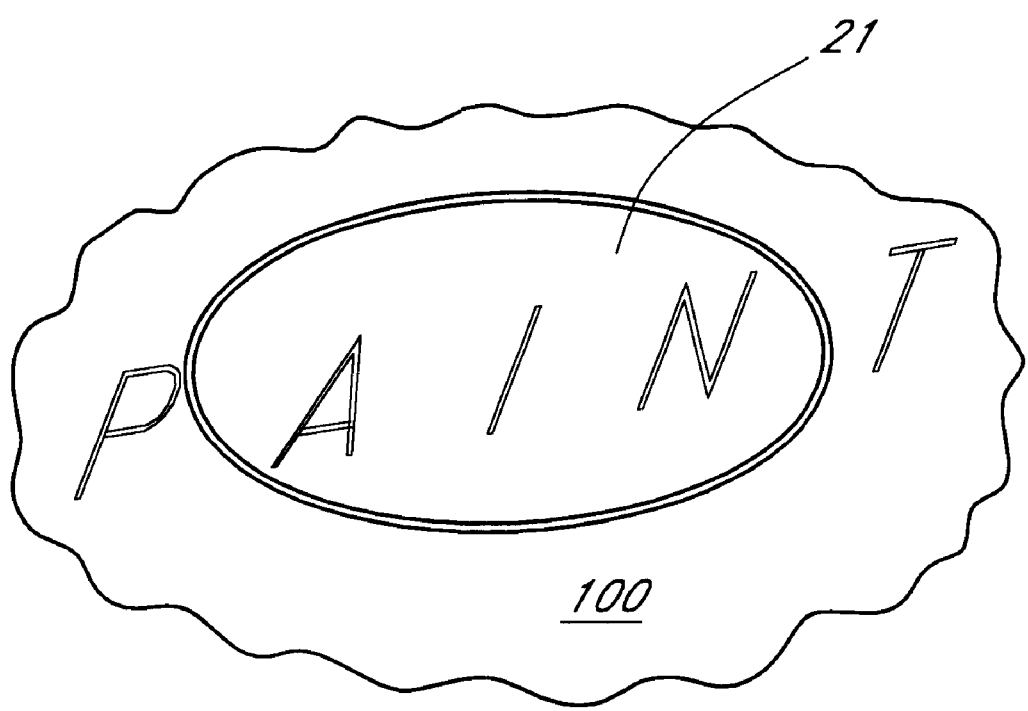
FIG. 8 is a perspective view of the tank cap shown in the down position.

The pin hole 44 is preferably located at a point on the shaft 28 such that when the handle 20 is in the down position, the pin 40 may not move below the bottom surface 36 of the cylinder portion 30 thus limiting the rotation of the handle 20 to the angle θ between the notch 54 and the slot 50. Of course, if the cylinder 30 is provided with a baffle plate 82, the baffle plate 82 would limit travel of the pin 40 in a downward direction. This allows the tank cap 110 to be returned to its original position after each use, thus allowing the orientation of patterns painted into the top of the disk section 24 to be maintained as illustrated in FIG. 8.

Referring to FIG. 5, a spring 90 is preferably disposed along the shaft 28 of the handle portion 20 such that the spring 90 may be compressed between the bottom surface 26 of the handle portion 20 and the circular shelf 32 of the cylinder portion 30. The spring 90 is preferably a coil spring, and preferably has an internal coil diameter such that it may move freely along the shaft 28. As will be recognized by those of skill in the art, however, other types of springs may be used in various orientations without departing significantly from the present invention.

The handle 20 is preferably movable between an "up" position (FIG. 5), an "intermediate" position and a "down" position (FIG. 6). In the up position, the handle 20 is held a substantial distance above the cylinder portion 30 by a spring 90 positioned and captured between the disk portion 24 of the handle portion 20 and the cylinder portion 30 such that it may be grasped by a user in order to remove the cap 110 as described below. The handle 20 is held in the down position by the pin 40 resting in a notch 54. When the handle 20 is in the down position, the handle 20 preferably sits flush relative to the outer surface of the tank 100 (as best shown in FIG. 8). "Flush" is defined herein by the top surface 21 of the handle 20 being in substantially the same plane or along the same curvature as the immediately surrounding outer surface of the tank 100. With the handle 20 in the intermediate position, the top surface 21 of the handle 20 is slightly below the surface of the surrounding tank 100. The handle 20 is held in the intermediate position by a downward force indicated by the arrow 200 preferably applied by the user. When in the intermediate position, the handle 20 is free to rotate relative to the cylinder portion 30 such that the pin 40 may move from the notch 54 to the slot 50 and back (as best shown in FIGS. 1 and 2).

The handle 20 is preferably biased toward the up position by a spring 90 disposed along the shaft 28 of the handle portion 20 between the bottom surface 26 of the handle 20 and a circular shelf 32 of the cylinder portion 30. The upward motion of the handle 20 relative to the cylinder portion 30 is stopped when the pin 40 contacts the top 52 of the slot 50.

In order to move the handle portion 20 from the down position (FIG. 6) to the up position (FIG. 5), the handle 20 is pressed downwards as indicated by the arrow 200 and rotated such that the pin 40 aligns with the slot 50. Removing the downward pressure from the handle 20 will allow the spring 90 to push the handle 20 upwards until the pin 40 engages the top 52 of the slot 50. This position (shown in FIG. 5) is referred to as the "up" position. With the handle 20 in the up position, and the pin 40 held in the slot 50, the handle 20 may be rotated counter-clockwise thus causing the cylinder portion 30 to be rotated in the same direction, thereby allowing the cap 110 to be unscrewed.

The cap 110 may be screwed into the tank neck 100 and moved to the down position by reversing the above steps: With the handle 20 in the up position, the cap 110 can be screwed into the tank neck 100 by rotating the handle, and consequently, the cylinder portion 30 clockwise. The handle portion 20 may then be pressed down to the intermediate position and rotated such that the pin 40 is directly below the notch 54. Releasing the handle will leave the handle 20 in the down position with the pin 40 held in the notch 54. As will be recognized by those skilled in the art, when moving between the up and down positions, the direction of rotation of the handle 20 may vary depending on the specific orientation of the slot 50 (FIG. 1) and notch 54 relative to one another.

As shown in FIGS. 5 and 6, the neck or bung 100 preferably includes a distal section 102 which extends distal the cylinder 30 or baffle plate 82 (shown in phantom). Advantageously, by extending the neck 100 distal the cylinder 30 or plate 82 prevents liquid fuel from traveling up the slot 50 and out of the gas tank through hole 80. Thus, the distal end 102 of the neck 100 deflects liquid fuel and assists in preventing the fuel from leaking from the tank. Alternatively, the features of the present invention can be recognized by having the neck adjacent to or proximal of the cylinder 30 and/or plate 82.

Referring to FIG. 7, the arrangement of the components of one embodiment of the cap of the present invention are illustrated in an exploded view. As discussed herein, not all of the components shown are necessary to realize the advantages of the present invention. For example, the plate 82 may be secured to the cylinder 30 without use of screws 84. In addition, the plate 82 may not be necessary. Likewise, the washer 70 may not be required to adequately prevent leakage of fuel out of the tank.

Figure 9:
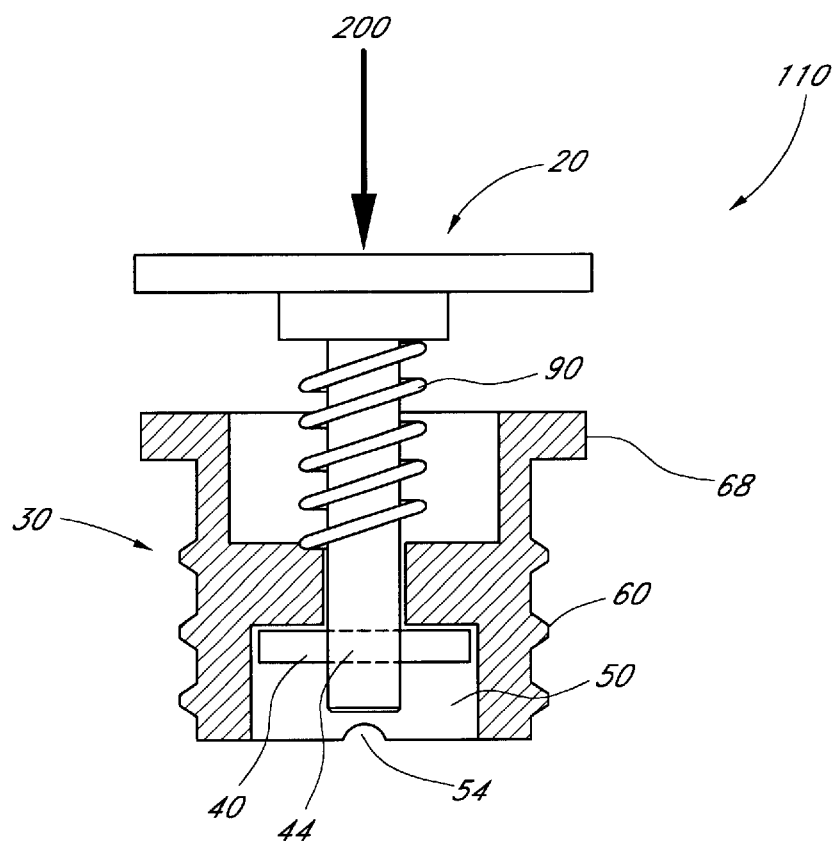
FIG. 9 is a section view of an alternative embodiment of a tank cap.
Figure 10:
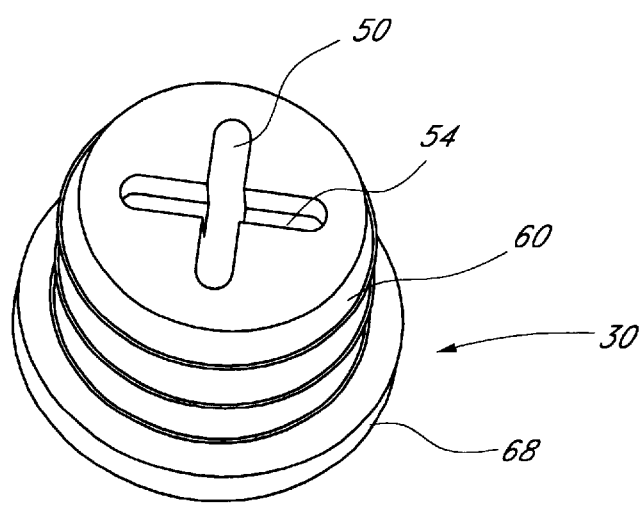
FIG. 10 is a perspective view of the bottom of the tank cap of FIG. 9.

In an alternative embodiment as shown in FIGS. 9 and 10, the slot 50 and the notch 54 are preferably substantially perpendicular to one another. In this embodiment, the pin 40 may extend a substantially equal distance from both sides of the shaft 28. In this alternative embodiment, the handle portion 20 is preferably free to rotate fully 360 degrees while in the intermediate position. The intermediate position in this embodiment is similar to that in the preferred embodiment with the exception that in this alternative embodiment, the shaft 28 and pin 40 may extend substantially below the bottom surface of the cylinder 30. In this case, a plate 82 is not provided and the handle 20 may be moved from the up position to the down position by pressing downward on the handle 20 as indicated by the arrow 200 until the handle is in the intermediate position described above, and then rotating the handle 20 either clockwise or counter-clockwise by an odd multiple of 90 degrees until the pin 40 aligns with the notch 54. Releasing the handle 20 in this position will leave it in the down position.

In this embodiment, in the down position, the cap 110 may rest in one of two positions. Thus, this embodiment may not be desirable in the event that it is preferable to have the cap rest in only one orientation in the down position such as that shown in FIG. 8 to align paint on the exterior of the disk 24 with surrounding paint for a unitary, uninterrupted appearance. Alternatively, a user may carefully align the paint in the correct orientation when placing the pin 40 in the notch 54 as will be understood of those of skill in the art.

Directional words such as "up," "down," "top," and "bottom" are used herein to describe the relative geography of the parts described and refer to the position the cap assumes when it is threaded into the top of a motorcycle fuel tank. Such terms and phrases are not intended to describe positions or directions relative to any frame of reference external to said parts.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A device for closing a fuel tank comprising:
   a handle portion having a disk portion and a central shaft having a central longitudinal axis;
   said shaft having a pin extending radially from exactly one side of said shaft;
   a cylinder portion having a hole formed through its center sized such that said shaft of said handle portion may be inserted therein;
   a baffle plate at a distal end of said cylinder portion;
   said cylinder having a threaded section for screwing said device into the opening of said tank;
   said handle portion being movable between an up and a down position relative to said cylinder portion;
   a notch formed in said cylinder portion such that said pin may rest therein when said handle is in said down position, and
   a slot formed in said cylinder portion at an angle relative to said notch, and sized such that said pin slides freely therein when said handle is moved from said up position to said down position, said slot stopping said handle from rotating relative to said cylinder.

2. The device of claim 1, further comprising a spring disposed between said disk portion and said cylinder portion.

3. The device of claim 1, further comprising a rubber washer disposed on said threaded section of said cylinder portion.

4. The device of claim 1, further comprising a gasket disposed on said threaded section.

5. The device of claim 1, wherein said notch and said slot are formed at right angles to one another.

6. The device of claim 5, wherein said handle is rotatable through 180 degrees.

7. The device of claim 5, wherein said handle is only rotatable relative to said cylinder portion through said angle defined by said notch and said slot.

8. The device of claim 1, wherein said notch and said slot are formed with an angle less than ninety degrees between them.

9. The device of claim 8, wherein said handle is only rotatable relative to said cylinder portion through said angle defined by said notch and said slot.

10. The device of claim 1, wherein said handle portion sits flush relative to said tank.

11. A device for closing a fuel tank comprising:
   a handle portion having a disk portion and a central shaft having a central longitudinal axis;
   said shaft having a pin extending radially from only one side of said shaft;
   a cylinder portion having a hole formed through its center sized such that said shaft of said handle portion may be inserted therein;
   a baffle plate at a distal end of said cylinder portion;
   said cylinder having a threaded section for screwing said device into the opening of said tank;
   said handle portion being movable between an up and a down position relative to said cylinder portion;
   a notch formed in said cylinder portion such that said pin may rest therein when said handle is in said down position, and
   a slot formed in said cylinder portion at an angle relative to said notch, and sized such that said pin slides freely therein when said handle is moved from said up position to said down position, said slot stopping said handle from rotating relative to said cylinder, said notch and said slot being formed with an angle of less than ninety degrees between them.

12. The device of claim 11, wherein said shaft comprises a hollow tube.

13. The device of claim 11, further comprising a rubber washer disposed on said threaded section of said cylinder portion.

14. The device of claim 11, further comprising a gasket disposed on said threaded section.

15. The device of claim 11, wherein said handle is only rotatable relative to said cylinder portion through said angle between said notch and said slot.

16. The device of claim 11, further comprising a second hole in said cap, said second hole allowing passage of air between the inside and the outside of said tank.

17. The device of claim 11, wherein said handle portion sits flush relative to said tank.

18. A device for closing a fuel tank comprising:
   a handle portion having a disk portion and a central shaft having a central longitudinal axis;
   said shaft having a pin extending radially from only one side of said shaft;
   a cylinder portion having a hole formed through its center sized such that said shaft of said handle portion may he inserted therein;
   a baffle plate at a distal end of said cylinder portion;
   said cylinder having a threaded section for screwing said device into the opening of said tank;
   said handle portion being movable between an up and a down position relative to said cylinder portion;
   a notch formed in said cylinder portion such that said pin may rest therein when said handle is in said down position, and
   a slot formed in said cylinder portion at an angle relative to said notch, and sized such that said pin slides freely therein when said handle is moved from said up position to said down position, said slot stopping said handle from rotating relative to said cylinder, said notch and said slot being formed with an angle of less than ninety degrees between them, and
   a spring disposed between said handle portion and said cylinder portion.

19. The device of claim 18, wherein said handle portion sits flush relative to said tank when in said down position.

20. The device of claim 18, wherein said shaft comprises a hollow tube.

21. The device of claim 18, further comprising a rubber washer disposed on said threaded section of said cylinder portion.

22. The device of claim 18, further comprising a gasket disposed on said threaded section.

23. The device of claim 18, wherein said handle is only rotatable through said angle between said notch and said slot.

24. The device of claim 18, further comprising a second hole in said cylinder portion, said second hole allowing passage of air between the inside and the outside of said tank.

* * * * *